(No Model.)
J. A. HERDMAN.
LISTING CULTIVATOR.
No. 501,940. Patented July 25, 1893.
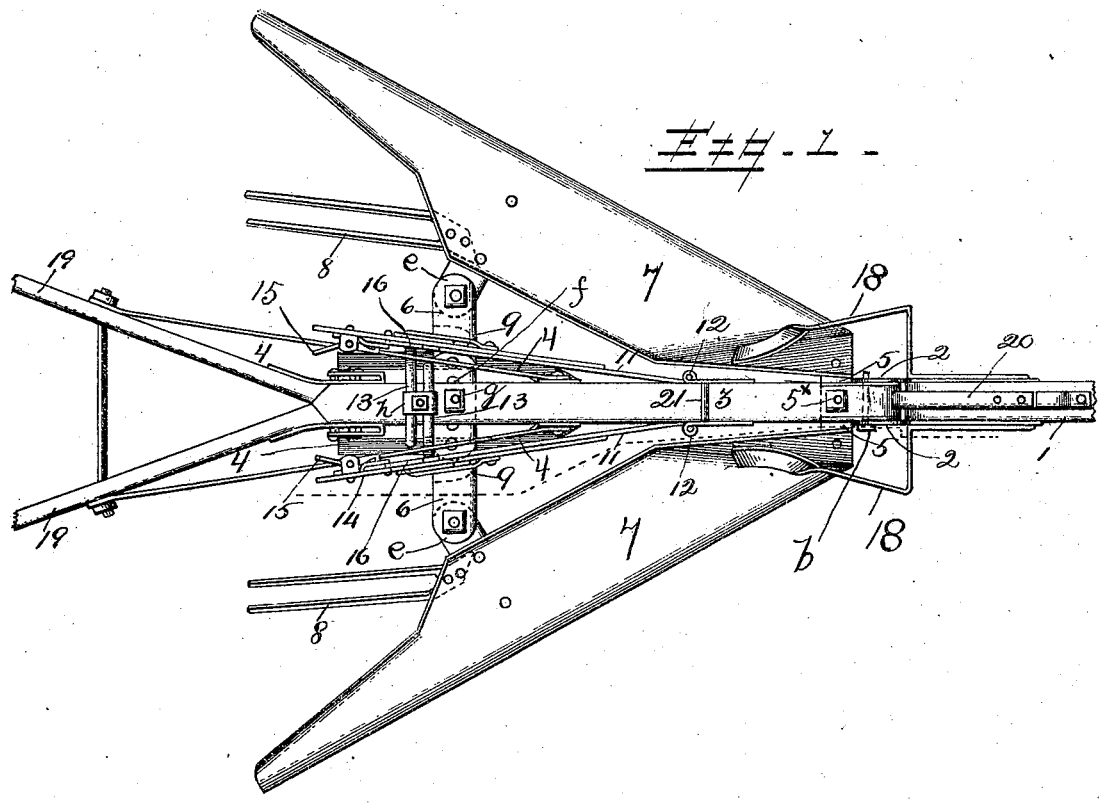
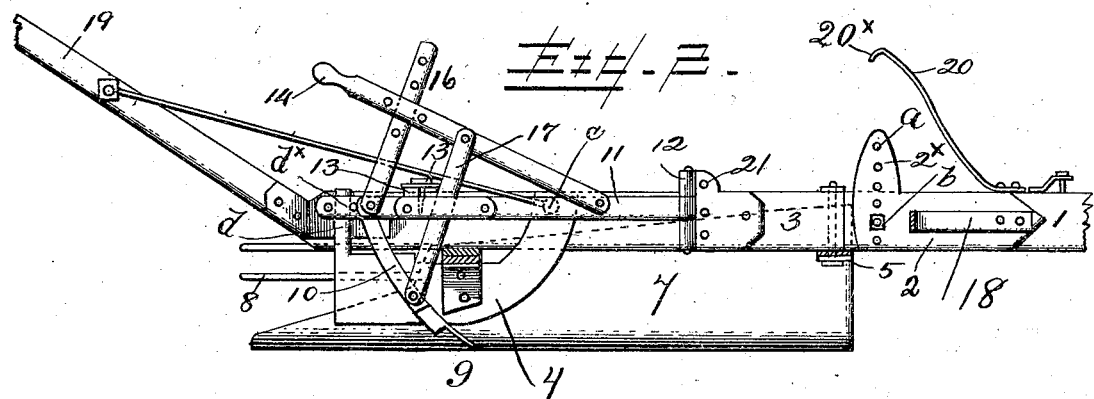
WITNESSES:
Albert B. Blackwood.
Wm N. Bates
INVENTOR
James A. Herdman
BY
W. S. Hamilton
ATTORNEY.

UNITED STATES PATENT OFFICE.

JAMES A. HERDMAN, OF LINCOLN, NEBRASKA.

LISTING-CULTIVATOR.

SPECIFICATION forming part of Letters Patent No. 501,940, dated July 25, 1893.

Application filed June 11, 1891. Serial No. 395,877. (No model.)

*To all whom it may concern:*

Be it known that I, JAMES A. HERDMAN, a citizen of the United States of America, residing in Lincoln, in the county of Lancaster, in the State of Nebraska, have invented a new and useful Cultivator, of which the following is a specification.

My invention relates to straddle-row cultivators; and the object is to provide a cultivator for cleaning, cultivating, and listing rows of planted corn, and other similarly planted grains and vegetables, whereby the weeds and clods will be turned away from the rows and at the same time turn or throw the soil toward the rows.

I attain the object of my invention by the means or mechanism illustrated in the accompanying drawings, wherein—

Figure 1 is a plan view of my improved cultivator, and Fig. 2 is a side view partly in section.

The tongue 1, has secured to it a clevis 2, consisting of substantial plates fixed to the sides of the tongue, projecting beyond the rear-end of the tongue and formed with vertically projecting ears $2^x$, and in the projecting ends and ears are a series of vertically arranged pin-holes $a$, through which a coupling-pin $b$ is passed, which extends through the beam 3, and thus couples the beam to the tongue. By attaching or connecting the beam and tongue with the pin in higher or lower position in the clevis the plows are set to run deeper or shallower. To the sides of the rear portion of the beam 3 are arranged runners 4, having their front upper ends pivotally connected to the beam, as at $c$, (Fig. 2) and their rear ends formed with projecting-piece $d$ secured adjustably in a keeper $d^x$, on the beam. These runners steady the cultivator when working, and can be moved down to support the cultivator whenever desired.

The cultivator plows 7, consist of oppositely arranged plates standing with their lower edges directed outward, and flaring toward the rear of the cultivator, substantially as shown in Fig. 1 of the drawings. The front ends of the plow are secured to the beam by laterally projected plate 5, and a fastening bolt $5^x$, and at the rear portion have lugs $e$, to which are pivotally bolted slides 6, lying across the beam, as shown, and having perforations $f$, through which the fastening-bolt $g$ passes. It will be seen from the foregoing that the wings of the plow can be adjusted to run close or wide, by fixing their relation in the adjustment of the side pieces, and thus be adapted to rows at different planted distances.

Attached to and extending rearwardly from the plow wings 7, are fingers 8, intended to prevent the heavy clods or unbroken earth from falling on the corn.

In Fig. 2 is shown one of the shovel plows or cultivator-blades 9, which serve to turn the soil from which the weeds have been cut by the main plow, toward the row over which the cultivator travels. The plows 9, there being two, but only one clearly shown, have shanks 10, pivoted at the upper end to the rear ends of arms 11, jointed or hinged at their forward ends 12, to the beam 3, and at their rear ends have laterally projecting arms 13, arranged to adjustably slide in a keeper $h$, on the beam, as shown in Fig. 1, of the drawings. By these means the plows 9 may be brought closer or wider apart. The depth at which the plows 9 are to work is determined and regulated as follows: Pivoted to about the center of the arms 11 is a lever 14, the handle of which is provided with a latch 15, engaging in one of the perforations in a latch arm 16, pivotally secured at its lower end to the arm 11. A connecting-bar or rod 17 has its ends pivotally secured respectively to the shank of the plow 9 and lever 14, as shown in Fig. 2 of the drawings. By raising or lowering the levers 14, the plows 9 will be correspondingly affected, and thus the depth of the furrow or cut regulated. The shields 18 are bolted to, and extend rearward from the tongue 1 resting on the front ends of the plow-wings of the cultivator-plow 7, and protect the corn from being turned to strike the plow-wings. Handles 19 are attached to the rear end of the beam 3.

To the upper face of the tongue 1 is fixed a spring catch 20, having its free end formed with a hook $20^x$ to engage a rod or catch-piece 21, on the beam 3, so that when the end of a row is reached and the turn is to be made, the cultivator may be tilted up until the hook of the spring 20 engages the catch-piece 21, and the cultivator thus held in substantially vertical position, may be carried around to the end of the next rows with the wings and plows entirely free above the ground and corn.

Having thus described my invention, what I claim as new, and desire to secure by Letters Patent, is—

1. In a cultivator, the combination of the tongue 1, the beam 3 jointed to the tongue to swing in a vertical plane, the runners 4, having their front ends pivotally attached to the beam, and their rear ends adjustably connected therewith, the cultivator plow 7, adjustably connected to the beam, and the shovel-plows 9, substantially as specified.

2. In a cultivator, the combination of the tongue 1, the clevis 2 formed with vertically arranged rows of pin-holes, in the beam 3, adjustably connected to the clevis, the cultivator plow 7, the fingers 8, on the rear of the plow-wings, and the shields 18, on the beam at the front and resting on the plow wings, as described.

3. The combination of the beam 3, the arms 11 hinged to the beam to swing horizontally, the plows 9, having their shanks pivotally secured to the arms 11, levers fulcrumed to the arms 11, and connecting rods between the plow-shanks and the levers whereby the plows may be lifted and lowered.

4. The combination of the beam 3, the hinged arms 11 on opposite sides of the beam formed with laterally projected arms 13, and a keeper $h$, on the beam to take and hold the arms 13, and the plows 9, substantially as and for the purpose specified.

In witness whereof I have hereunto set my signature in the presence of two witnesses.

JAMES A. HERDMAN.

Witnesses:
JOSEPH WÜRZBURG,
E. H. ZEMECKE.